No. 738,145. PATENTED SEPT. 8, 1903.
E. G. ALBAUGH.
PEA HULLER.
APPLICATION FILED MAR. 16, 1903.
NO MODEL. 4 SHEETS—SHEET 1.

No. 738,145. PATENTED SEPT. 8, 1903.
E. G. ALBAUGH.
PEA HULLER.
APPLICATION FILED MAR. 16, 1903.
NO MODEL. 4 SHEETS—SHEET 4.

Witnesses
E. G. Albaugh, Inventor.

No. 738,145. Patented September 8, 1903.

UNITED STATES PATENT OFFICE.

EDGAR G. ALBAUGH, OF FREDERICK, MARYLAND.

PEA-HULLER.

SPECIFICATION forming part of Letters Patent No. 738,145, dated September 8, 1903.

Application filed March 16, 1903. Serial No. 148,071. (No model.)

*To all whom it may concern:*

Be it known that I, EDGAR G. ALBAUGH, a citizen of the United States, residing at Frederick, in the county of Frederick and State of Maryland, have invented a new and useful Pea-Huller, of which the following is a specification.

This invention relates to machines for hulling green peas from the vines of that class which embody in their general construction a revoluble, open-ended, spokeless, and shaftless outer cylinder having interiorly-disposed ribs in combination with interiorly-disposed revoluble beaters and into which the pea-bearing vines are fed at one end, subjected to a thorough threshing and separation during their progress through the machine, and from which the vines and pods are delivered at the opposite end, while the peas, threshed and separated therefrom, are conveyed to a suitable place of deposit.

My present invention has for its object to construct a machine of this class which shall possess superior advantages in point of simplicity, durability, and general efficiency and in which shall be embodied new and useful details of construction, as will be hereinafter fully described, and particularly pointed out in the claims.

Figure 1:
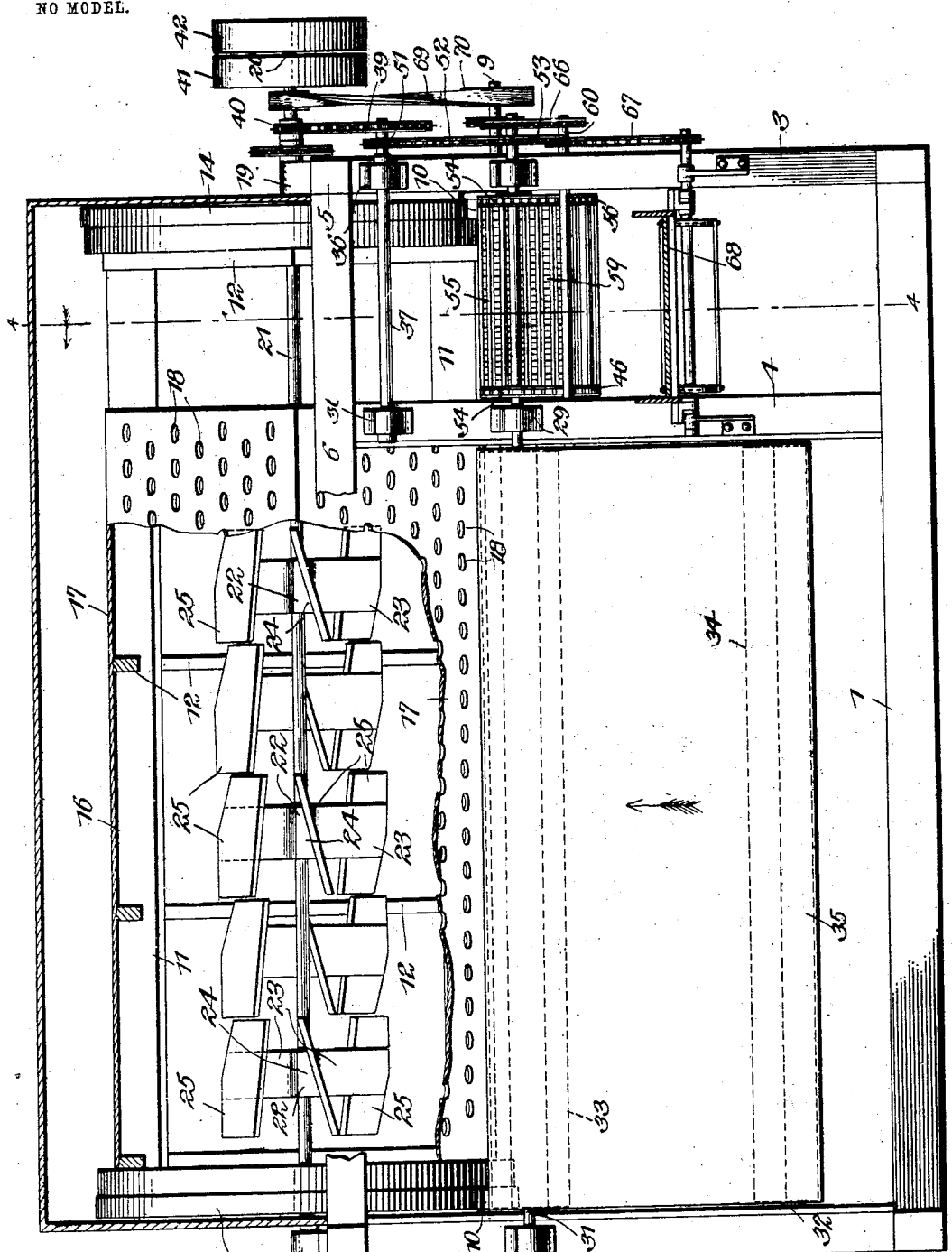
Figure 2:
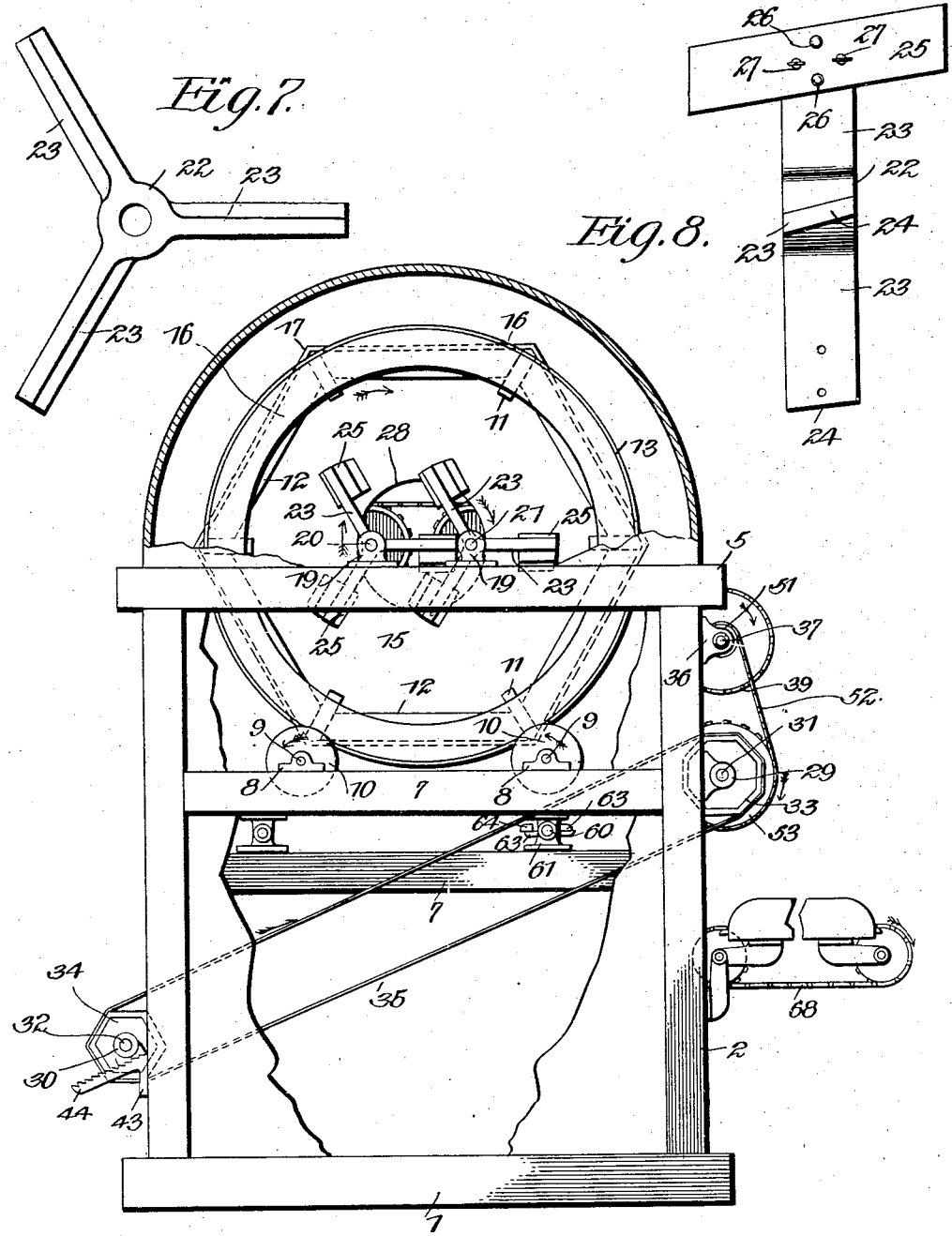
Figure 3:
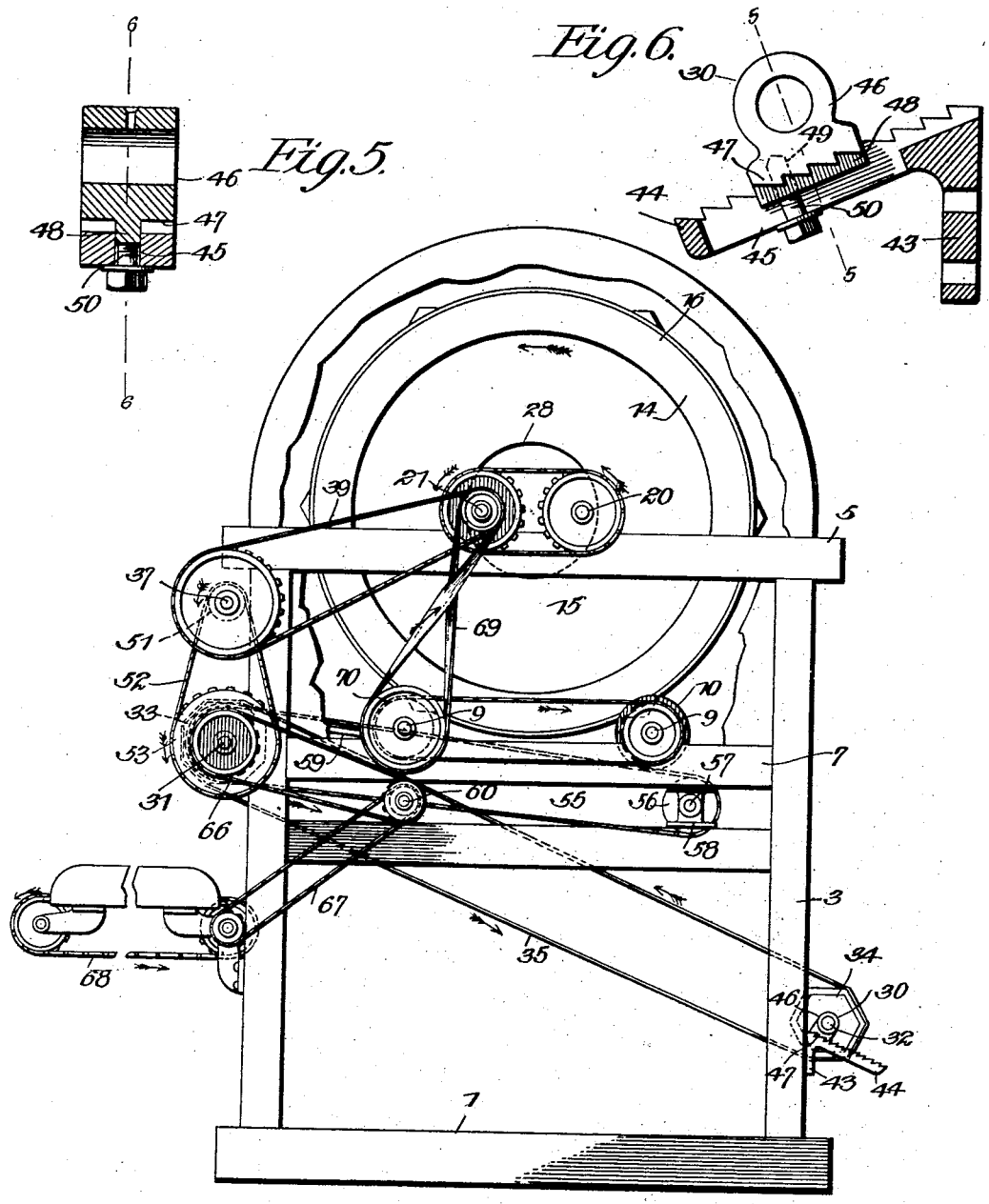
Figures 4, 9:
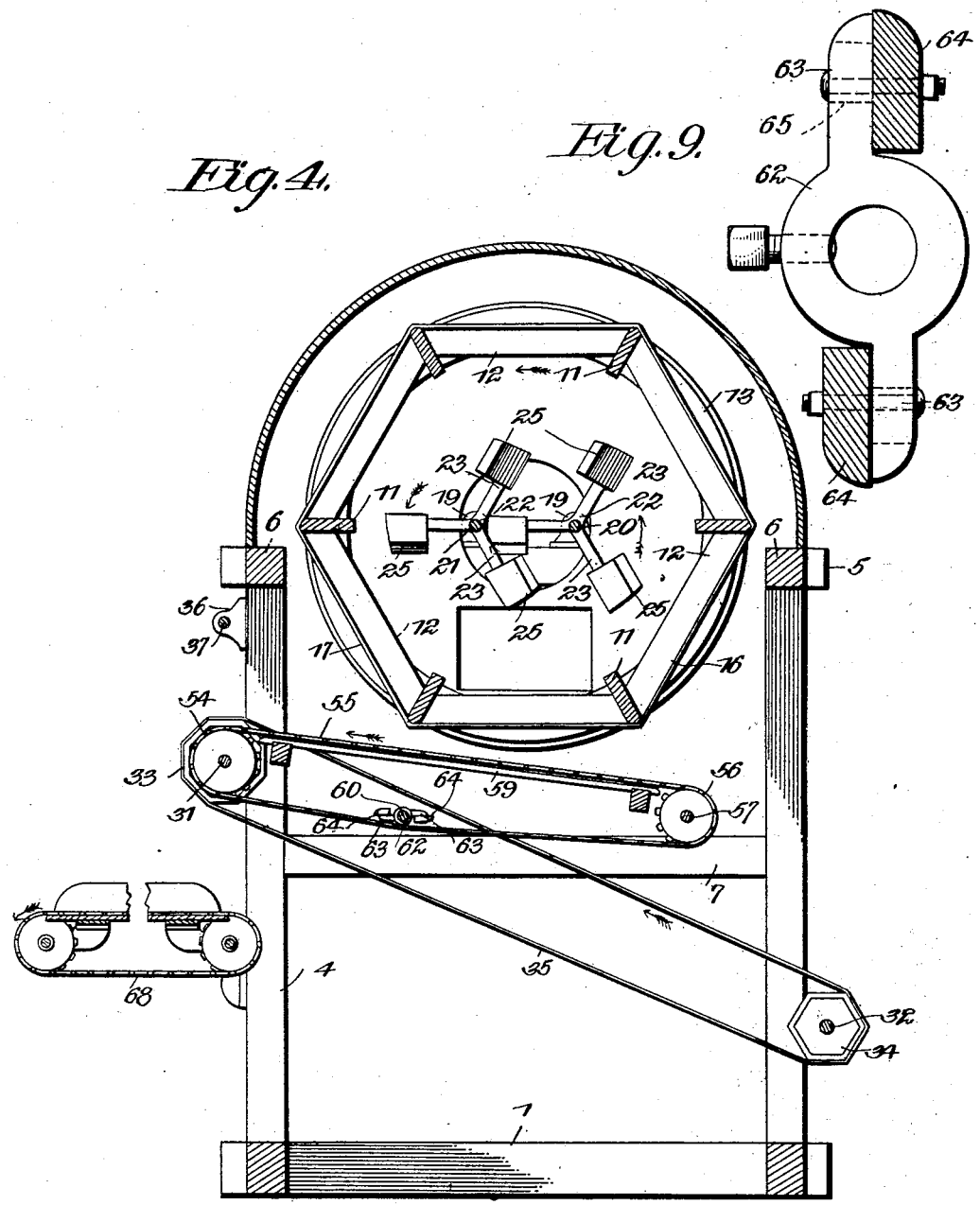

In the accompanying drawings, Figure 1 is a side elevation of my improved pea-huller with a portion of the perforated casing removed in order to expose the interior construction. Fig. 2 is a front view. Fig. 3 is a rear end view. Fig. 4 is a transverse sectional view taken on the line 4 4 in Fig. 1. Fig. 5 is a sectional detail view of one of the adjusting devices for the separator-apron, taken on the line 5 5 in Fig. 6. Fig. 6 is a sectional view of the same device, taken on the line 6 6 in Fig. 5. Fig. 7 is a detail end view of one of the beaters. Fig. 8 is an edge view of the same, showing one of the blades in position upon one of the arms of the beater and the means for adjusting the same. Fig. 9 is a detail end view of one of the devices for agitating the separator-apron, showing in section the battens adjustably mounted upon the same.

Corresponding parts in the several figures are indicated by similar numerals of reference.

The framework of my improved pea-huller as illustrated in the appended drawings is composed of a rectangular base-frame 1, front and rear end frames 2 and 3, rising from said base-frame, an intermediate upright frame 4, rising from the base-frame at no great distance from the rear end frame, and cap-beams 5 and 6, disposed transversely and longitudinally, as shown. The front and rear frames 2 and 3 are provided with cross-braces 7. Mounted upon and securely bolted to said cross-braces are boxes or bearings 8, in which are journaled shafts or spindles 9, carrying flanged wheels 10, upon which the outer or main cylinder of my improved pea-huller is supported. The said cylinder, which is designated 16, is composed of a framework comprising a plurality of longitudinal ribs 11, connected by means of braces 12, so as to form the framework of the cylinder, which in its preferred construction, as herein shown, is more properly described as a polygonal drum. In the drawings this drum has been shown as being hexagonal in cross-section. This framework is securely braced and connected, so as to form a structure possessing considerable strength, and at the ends of said framework are mounted a pair of circular heads 13 and 14, the former of which is disposed at the front or feed end of the machine, while the latter is at the rear or discharge end. The principal object of these circular rings or heads is to form supporting means whereby the drum may be supported revolubly upon the flanged wheels 10. The head 13 has an opening of a size practically corresponding with the cross-sectional area of the drum, so that the pea-bearing vines may be fed into the said drum in large quantities. The head 14 at the discharge end of the drum is provided with a disk or closure 15, which will check the discharge of the vines and prevent them from becoming entangled with the operating parts of the machinery, as will be hereinafter more fully described.

The drum 16, or rather the framework of said drum, is provided with a covering 17, which is preferably composed of heavy rubber in the form of a sheet or band having perforations 18 of about five-eighths of an inch in diameter or of any other suitable size which shall be considered effective for the purpose of effecting the separation of the peas from the halm and permit the escape of the peas through said openings. This rubber covering may be composed of a single band or of a plurality of sections, the latter construction being probably preferred in order to enable repairs to be made when needed more conveniently and at less expense than would otherwise be the case. I desire at this point to state particularly that I do not limit myself to any particular form or method of construction of the drum, its framework, or the covering thereof. Drums of this kind have long been used in machines employed for the hulling of peas and for analogous purposes, and I do not wish to limit myself to any structural details of the drum. It will, however, be particularly observed that the covering, consisting in this case of perforated rubber, does not extend the entire length of the framework of the machine, but is discontinued at that part of the drum which is disposed in alinement with the intermediate frame 4, rising from the supporting-base of the machine. It follows from this construction that the threshed and mutilated vines and pods will be discharged from the drum between the frames 4 and 3.

The cap-pieces 5 of the front and rear frames 2 and 3 support boxes or bearings 19 for a pair of longitudinally-disposed shafts 20 and 21, which constitute the beater-shafts of the machine. Each of these shafts is provided with a plurality of hubs 22, disposed intercurrently upon the said shafts, and each is provided with a plurality of arms or spokes 23, preferably three in number, which radiate from the said hubs. These arms or ribs are preferably disposed in an inclined position or slantingly with relation to the axes of the hubs and provided with slantingly-cut-off ends 24. These spokes or arms constitute the beater-arms, and to their outer ends the beater-blades 25 are secured, preferably by means of bolts 26, which, however, form loose joints, so that the boards 25 may be tilted thereon in the direction of the length of the beater-shafts. The beater-blades 25 are provided on opposite sides of the connecting-bolts 26 with thumb-screws 27, the inner ends of which press against the beater-arms 25, so that the tilt of the beater-blades 25 may be regulated.

The beaters, comprising the hubs, arms, and beater-blades, are disposed, as described, intercurrently upon the two beater-shafts, and the length of the beater-blades is such that their ends will be disposed very closely together, so closely, in fact, as to exercise almost a cutting and shearing action upon the vines when the machine is in operation, the arms of the several beaters being obviously of sufficient length to intersect each other, as will be readily understood by reference to the drawings. Of these beaters any desired number may be used, the number being gaged according to the dimensions of the machine and to the relative sizes of the beaters. The latter will all be disposed within the covered portion of the drum, none being placed upon the portions of the beater-shafts which extend beyond the intermediate frame 4. It may here be observed that the end disk 15 upon the rear head 14 of the drum is provided with a central opening 28 sufficiently large to accommodate the beater-shafts. This, however, will not interfere with the efficiency of said disk in checking the rearward discharge of the halm.

The framework of the machine is provided with suitable boxes or bearings 29 and 30 for a pair of shafts 31 and 32, supporting a pair of polygonal rollers 33 and 34, the length of which is about equal to the length of the covered portion of the drum and which serve to support an endless apron or conveyer 35, which is inclined downwardly from the rear to the front side of the machine. The rear side of the frame also supports a box 36 for the shaft 37 of an idler, which is connected by a belt 39 with a pulley 40 upon the beater-shaft 21. The latter is belted to the beater-shaft 20, which carries the drums or pulleys 41 and 42, the former of which is tight and the latter of which is loose upon said shaft, which through the medium of the tight pulley receives motion from the source of power. The boxing 30, which supports the shaft of the roller at the lower end of the carrier 35, comprises in its construction a plate 43, which is securely bolted to the framework of the machine and which is provided with an outwardly and downwardly inclined ratchet-bar 44, having a longitudinal slot 45. 46 designates a bearing-block, which is bored for the reception of a shaft which is provided with ratchet-teeth 47 to engage those of the ratchet-bar 44 and with a centrally-disposed flange 48, which is guided in the slot 45 of said ratchet-bar. The flanged portion of the bearing-block has a threaded perforation 49, adapted to receive a bolt 50, by means of which secure connection may be effected between the ratchet-bar and the bearing-block, as will be readily understood. This simple device enables the tension of the endless apron or carrier 35 to be readily adjusted at any time when it shall be found desirable to do so—as, for instance, when it may have become slack owing to long-continued use. This device is of no little importance in connection with my invention, for the reason that it is quite important that the endless carrier 35 be kept at all times smooth, taut, and free from wrinkles, inasmuch as otherwise its operation and efficiency would be seriously interfered with. By the improved tightening device which I have just described the slack may at any time be taken up without suspending the operation of the machine.

The idler-shaft 37, as already described, is belted to the beater-shaft 21, which receives motion through the shaft 20 from the source of power. The shaft 37 of the idler is provided with a pulley 51, connected by a belt 52 with a pulley 53 upon the shaft 31 at the upper end of the carrier 35. That portion of the shaft 31 which is disposed between the intermediate and rear frames 4 and 3 of the framework is provided with pulleys 54, supporting the upper end of an endless slatted carrier 55, the lower end of which is supported upon pulleys 56, mounted upon a shaft 57, journaled in suitable boxings 58, supported upon the frame of the machine. Directly underneath the upper lead of the carrier 55 is disposed a grating 59, the slats of which incline downwardly and are disposed so closely together as to prevent the passage between them of peas of ordinary size. The function of this grating will be presently more fully described.

60 designates a shaft which extends longitudinally through the frame, said shaft having its bearings in boxes 61, suitably supported from the framework of the machine. This shaft carries a plurality of hubs 62, provided with oppositely-disposed radiating arms 63, to which beaters or knockers 64 are suitably secured by means of bolts or otherwise, the connecting means being preferably of such a nature as to make the said knockers radially adjustable, which may be readily effected—as, for instance, by means of slots 65, formed therein for the reception of the connecting-bolts. These knockers are disposed directly beneath the upper lead of the endless carrier 35 and will when the shaft 60 is rotated strike against the under side of the apron constituting said carrier, so as to impart to the latter a vibratory motion.

The shaft 60 is driven from the shaft 31 by means of a belt 66, and a belt 67, leading from said shaft 60, serves to impart motion to an endless carrier 68 of suitable construction, whereby the trash is conveyed away from the machine to a suitable place of deposit.

Rotary motion is conveyed to the drum or cylinder from the shaft 21 by connecting the latter by means of a twisted belt 69 with a pulley 70 upon the shaft of one of the supporting-wheels 10 of said drum.

It will be observed that by belting the beater-shafts together in the manner described they will be rotated in the same direction, as indicated by arrows, and that the outer cylinder will be rotated in the same direction as the beater-shafts, as likewise indicated by an arrow. The endless carrier 35 is driven through the intermediate idler on the shaft 37 from the shaft 21 in the direction indicated by arrows, the upper lead of said carrier traveling in an upward direction. Movement in the same direction is obviously imparted to the slatted carrier 55.

In the operation of this machine the pea-bearing vines are fed into the drum at what I have chosen to designate the "front" end of the latter. Immediately on entering the drum the vines are seized upon by the rotating beaters, with the effect that they are violently torn asunder and subjected to a beating and threshing action which will very rapidly disintegrate the vines, break open the pods, and permit the peas to escape through the openings in the foraminous covering of the drum. The ribs 11, which constitute a portion of the framework of the drum, also serve as vine-elevators, whereby such vines as come into contact with the interior surface of said drum will be elevated, seized upon by the beaters upon the shaft 20, and carried upwardly and over the latter and into contact with the beaters upon the shaft 21. It will be observed, however, that owing to the inclined or what may be described as the "spiral" arrangement of the blades or boards of the beaters the vines are not only seized, but are carried forward as well, so that when passing from the beaters of one shaft to the beaters of the other shaft they will be subjected to a cutting or shear-like action, which will be found extremely effective in reducing and disintegrating the same, so as to insure a thorough and effective separation of the peas. By the time the vines by the feeding action to which they are subjected by the plates of the beaters have reached the discharge end of the machine it will be found that practically all of the peas have been extracted, very few of the peas remaining in the vines. From the uncovered end of the drum or cylinder disposed between the frames 4 and 3 the vines are discharged upon the slatted conveyer 55; but the peas, having escaped through the openings in the foraminous cover of the drum, will drop upon the smooth endless conveyer 35, together with such small portions of trash, dirt, and the like as may escape with the peas through the said openings. The peas will here be separated from the dirt and trash by rolling down the incline of the endless conveyer 35 in a direction opposite to the movement of the latter and into a receptacle or suitable place of deposit provided at the lower end of said inclined carrier 35. The dirt and trash, however, will not roll off the carrier, but will adhere thereto until the upper end of the upper lead is reached, when, the apron passing in a downward direction, such worthless material will be discharged, as will be readily understood. It is obvious that the separation of the peas from the trash will be greatly assisted by the vibrating motion which is imparted to the endless apron 35 not only by means of the beaters disposed underneath the upper lead of said apron, but also owing to the polygonal shape of the rollers upon which said apron is supported.

When the vines and pods are dropped upon the slatted carrier 55, the few peas remaining therein will have an opportunity of escaping between the slats of said carrier and onto the inclined screen or grate 59. This grating will permit fine trash to escape between the bars thereof, while the peas will roll in a downward direction upon said bars and into a suitable receptacle provided for their reception. The endless carrier 68 receives the halm and conveys the latter to any desired place of deposit, which may be located at a distance from the pea-huller.

A valuable feature of my invention is that it is capable of being fed automatically by machinery of suitable description as well and effectively as by hand. Most pea-hullers as heretofore constructed have been capable of being fed by hand only, it having been found necessary to tear asunder the tangled mass of vines before entering the machine in order that the said vines might be effectually operated upon, there being a natural tendency for the vines to work together and to become intertwisted into a compact mass or ball, resulting in only a partial separation of the peas from the vines or pods. By my improved machine the tendency of the beaters is to tear the mass of vines asunder, so that every part shall be belabored by the said beaters, with the result of effecting a thorough separation.

I desire it to be understood that while I have in the foregoing described a simple and preferred construction of my improved pea-huller I do not limit myself to the precise structural details herein described, but reserve the right to any changes and alterations which may be resorted to without departing from the scope or spirit of my invention and without sacrificing the utility of the same.

Having thus described my invention, I claim—

1. In a pea-huller, the combination with a revoluble, spokeless and shaftless drum, of shafts disposed longitudinally within said drum, and beaters intersecting each other and arranged intercurrently upon the said shafts.

2. In a pea-huller, the combination with a revolubly-supported drum, of a pair of longitudinal peripheral beater-shafts within said drum, and beaters disposed intercurrently upon said shafts and so intersecting each other that the blades of said beaters shall coact with a cutting or shear-like action.

3. In a pea-huller, a revolubly-supported spokeless and shaftless drum, beater-shafts disposed longitudinally within said drum and beaters disposed intercurrently upon said shafts, said beaters comprising hubs having radial, inclined arms with oblique outer ends, and blades mounted adjustably to the outer ends of said arms.

4. In a pea-huller, a beater comprising a hub having a plurality of radially-disposed, inclined arms, blades loosely bolted to the outer ends of said arms and set-screws extending through said blades and bearing against the arms to provide for the adjustment of the tilt or inclination of said blades.

5. In a pea-huller, a pea-separating device comprising a smooth endless carrier disposed in an inclined position, a shaft disposed beneath the upper lead of said carrier and radially-adjustable devices carried by said shaft to impact against the under side of and thereby agitating the upper lead of said carrier.

6. In a pea-huller, the combination with the hulling-drum, of a separating device consisting of an endless carrier disposed in an inclined position beneath the said hulling-drum, supports for said endless carrier, consisting of polygonal drums, and auxiliary, radially-adjustable means for agitating the upper lead of said carrier at a point intermediately between said supporting-drums.

7. In a pea-huller, a separating device comprising a smooth endless carrier, a shaft disposed beneath the upper lead of said carrier and having hubs provided with radiating arms, and battens mounted adjustably upon said radiating arms and serving to agitate the upper lead of said carrier.

8. In a pea-huller, a pea-separating device consisting of a smooth inclined endless carrier mounted upon rollers, stationary supports for the upper roller, brackets mounted upon the frame of the machine having downwardly and outwardly inclined ratchet-bars provided with longitudinal slots, bearing-blocks having ratchet-bars engaging those of the inclined ratchet-bars, and provided with centrally-disposed flanges guided in the slots of said ratchet-bars, means for connecting said ratchet-bars and bearing-blocks in adjusted position, and a lower roller-shaft for the endless carrier journaled in said bearing-blocks.

9. In a pea-huller having a revolubly-supported hulling-drum closed at one end, open at its opposite or receiving end and provided with a foraminous cover terminating short of the closed end of the drum, a slatted endless carrier disposed beneath the discharge-opening between the foraminous cover and the closed end of the drum, and an inclined grate disposed beneath the upper lead of said endless carrier.

10. In a pea-huller, a tailings-separator comprising a slatted endless carrier disposed in an inclined position beneath the discharge end of the hulling-drum, and an inclined grating disposed between the upper lead of said carrier, extending under the entire length of said upper lead and having its slats set close together so as to prevent the escape of valuable matter therebetween.

In testimony that I claim the foregoing as my own I have hereto affixed my signature in the presence of two witnesses.

EDGAR G. ALBAUGH.

Witnesses:
CHAS. B. T. HENDRICKSON,
AARON ROSENSTOCK.